Oct. 27, 1953     W. F. WILHELM ET AL     2,657,065
AUTOMATIC CHUCK

Filed Dec. 7, 1949     3 Sheets-Sheet 1

*INVENTOR.*
WALTER F WILHELM
MAX DE HAAS
BY
Woodling and Krost
attys

INVENTOR.
WALTER F. WILHELM
BY MAX DE HAAS

Oct. 27, 1953  W. F. WILHELM ET AL  2,657,065
AUTOMATIC CHUCK

Filed Dec. 7, 1949  3 Sheets-Sheet 3

INVENTOR.
WALTER F. WILHELM
BY MAX DE HAAS

Hoodling and Krost
attys

UNITED STATES PATENT OFFICE 2,657,065

AUTOMATIC CHUCK

Walter F. Wilhelm and Max De Haas, Dayton, Ohio, assignors to The Monarch Machine Tool Company, a corporation of Ohio Application December 7, 1949, Serial No. 131,568

17 Claims. (Cl. 279—16)

This invention relates, in general, to automatic chucks and more particularly to automatic work driver chucks which automatically grip the work piece.

An object of the invention is to provide an automatic chuck having gripping jaws which automatically adjust themselves to off-center relation to a work piece when the work piece is held in a lathe between centers.

Another object of the invention is the provision of an automatic chuck having a centrifugally actuated jaw which automatically grips the work piece upon rotation of the chuck.

Another object of the invention is the provision of gripping jaws which grip the work tighter with increased load.

Another object of the invention is to reduce the number of additional sets of jaws which are required to accommodate work pieces having a large range of diameters.

Another object of the invention is the provision of adjusting the gripping jaws whereby work pieces of variable diameters may be firmly held between jaws.

Another object of the invention is the provision of an automatic chuck which reduces the time required to chuck a work piece.

Another object is the provision of automatic chuck which is automatically self-centering.

Another object of the invention is the provision of the automatic chuck which is balanced for high speed rotation.

Another object of the invention is the provision of the automatic chuck which can be mounted directly on a rotary work spindle.

Other objects and a fuller understanding of the invention may be had by referring to the following description and claims taken in conjunction with the accompanying drawings, in which:

Figure 1:
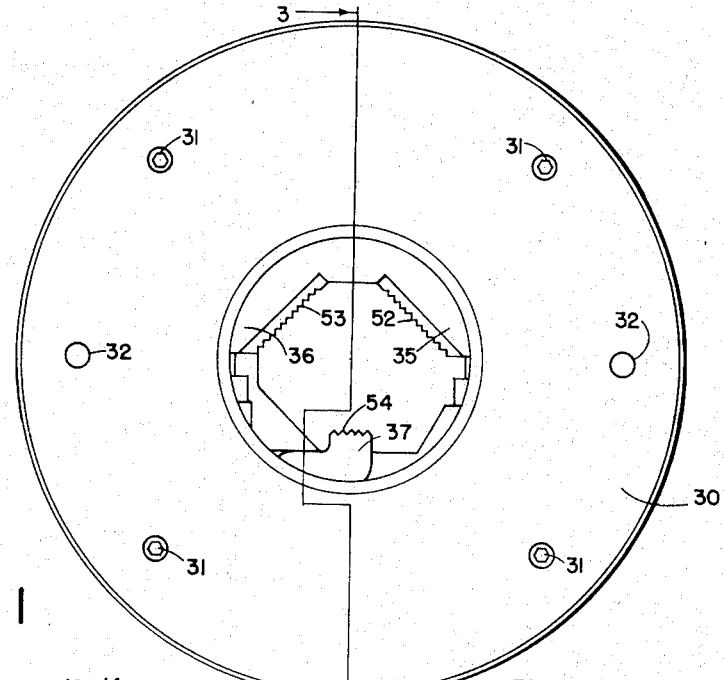
Figure 1 is a front view of a chuck embodying the features of the invention.

The chuck which is illustrated in the drawings is of a three-jaw type and comprises generally, a circular body 10 and a rotary chuck assembly illustrated generally by the reference character 14. The circular body 10 is adapted to be connected to a rotary spindle 11 by means of three bolts 12 which extend through three openings 13 of the circular body 10.

Figure 4:
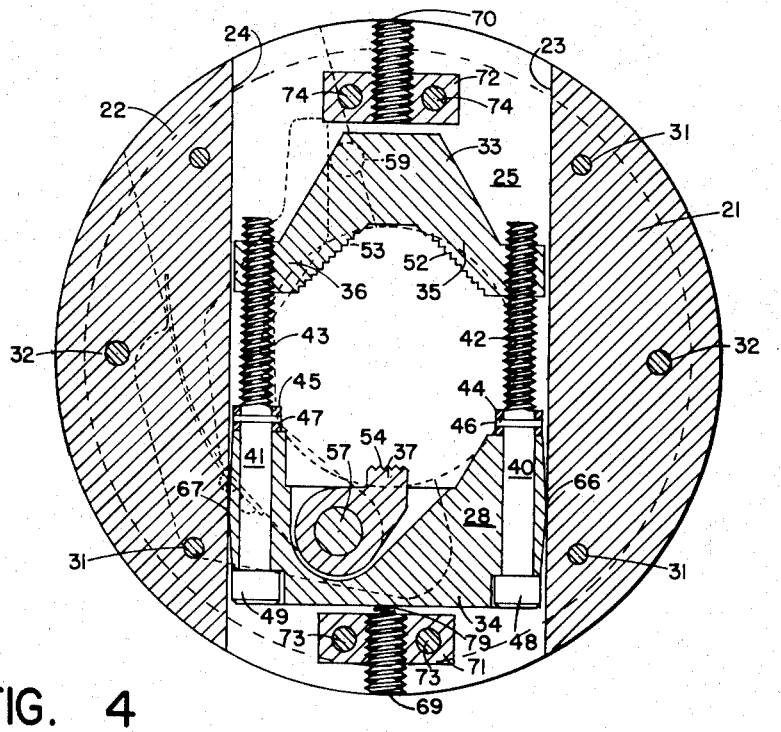
Figure 4 is a cross-sectional view of the chuck taken along the line 4—4 of Figure 2.

The rotary chuck assembly 14 comprises generally an annular body 15, a three-jaw work piece gripping unit 28, and a front plate 30. The annular body 15, the three-jaw work piece gripping unit 28 and the front plate 30 are held together as a unit by means of screws 31 and pins 32; see Figures 1 and 4. The annular body 15 is provided with a circular flange 16 which fits around the circular body 10 and which is adapted to be connected thereto by means of a fastening ring 17 and a plurality of screws 18. Thus, the rotary chuck assembly 14 is rotatable on the same axis as the circular body 10 which is connected to the rotary work spindle 11. As shown in Figure 4, the rotary chuck assembly 14 has two side plates 21 and 22 provided respectively with opposing side edges 23 and 24 which define a transversely extending socket 25 within which the three-jaw work piece gripping unit 28 is slidably mounted and which is self-centering to automatically adjust itself to an off-center relationship of a work piece when the work piece is held in a lathe between centers.

The gripping unit 28 comprises two slidable blocks 33 and 34 which are adjustably interconnected by means of adjusting screws 40 and 41 having threads 42 and 43 respectively, for engaging the opposite sides of the slidable block 33. As illustrated in Figure 4, the adjusting screws 40 and 41 are rotatably mounted in opposite sides of the slidable block 34. The adjusting screws 40 and 41 are held against longitudinal movement by means of collars 44 and 45 respectively, which are anchored to the adjusting screws by means of pins 46 and 47. The adjusting screws 40 and 41 are provided respectively with hollow socket heads 48 and 49 whereby a suitable tool may be mounted within the head sockets for rotating same for adjusting the spacing between the slidable block 33 and the slidable block 34.

Figures 2, 3:
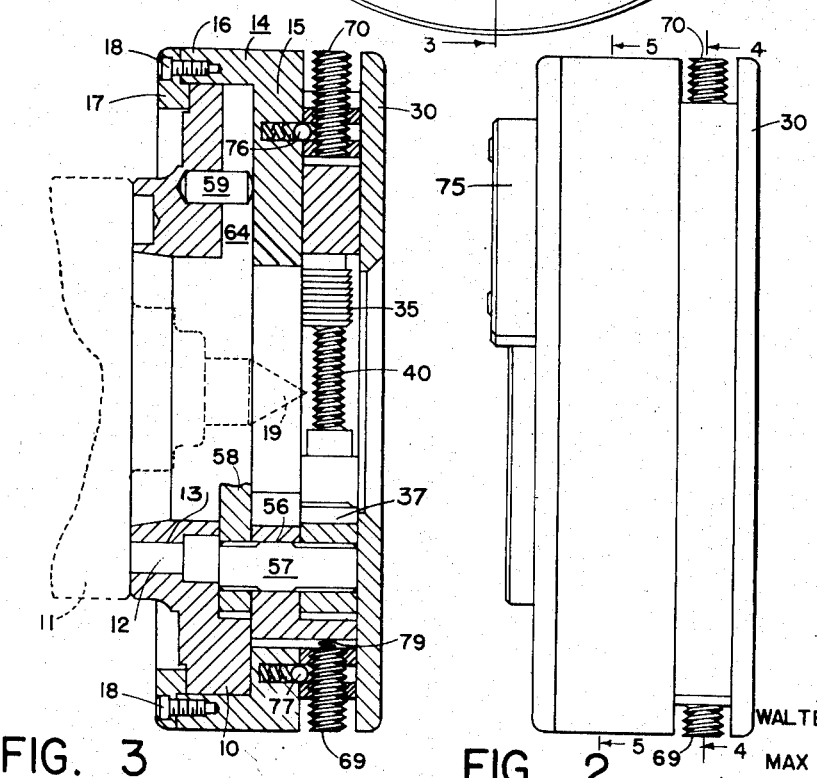
Figure 2 is a side view of the chuck shown in Figure 1.
Figure 3 is a cross-sectional view of the chuck taken along the line 3—3 of Figure 1.
Figure 5:
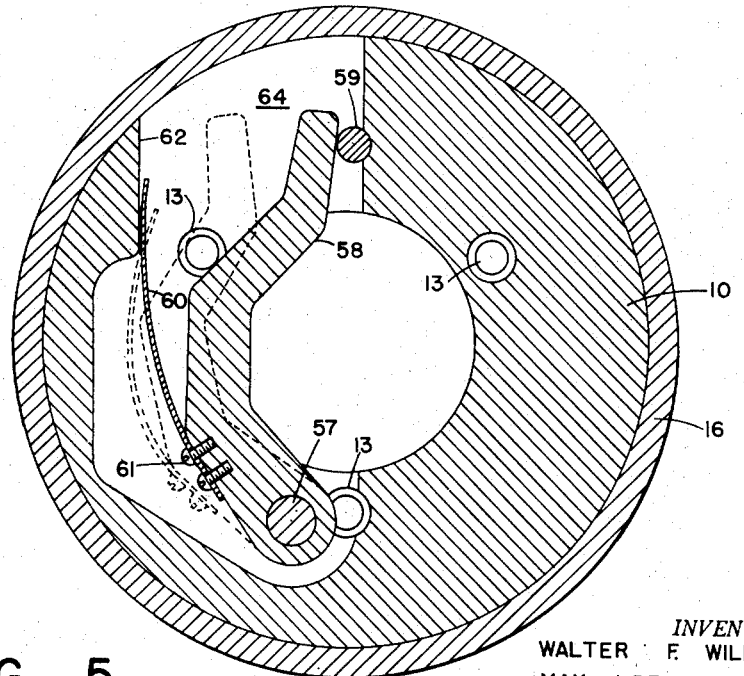
Figure 5 is a cross-sectional view of the chuck taken along the line 5—5 of Figure 2.

The slidable block 33 is provided with integral jaws 35 and 36 which have teeth 52 and 53 thereon producing a substantially V-shaped gripping surface for gripping the work piece. Rotatively mounted on the slidable block 34 is a hinged jaw 37 having teeth 54 facing the teeth 52 and 53 of the V-shaped gripping surface. The hinged jaw 37 is pivotally mounted on the slidable block 34 by means of a pivot pin 57 mounted within a pivotal opening 56. The hinged jaw 37 is non-rotatively connected to the right-hand end of the pin 57 as shown in Figure 3. Non-rotatively mounted on the left-hand end of the pivot pin 57 is a mass member 58 which is in the form of an arm mounted within a recess 64 provided in the circular body 10. Accordingly, the hinged jaw 37 is centrifugally actuated to grip a work piece by the mass member 58 upon rotation of the chuck. As shown in Figures 4 and 5, the upper end of the mass member 58 is urged against a stop pin 59 by means of an elongated leaf spring 60 having its lower end connected to the mass member by means of screws 61 and having its upper free end slidably engaging a side edge 62 of the recess 64. The leaf spring 60 opposes the movement of the mass member 58 and holds the swingable jaw 37 in its released position.

The work piece gripping unit 28, comprising slidable blocks 33 and 34, is adapted to slide longitudinally in the transversely extending socket 25 and thereby automatically bodily change the position of the three jaws with respect to the axis of rotation of the chuck body. The amount that the work piece gripping unit 28 may slide within the transversely extending socket 25 is governed by adjustment stop elements 69 and 70 which are threadably engaged respectively in fixed blocks 71 and 72 fastened to the annular body 15 by means of screws 73 and 74. The work piece gripping unit 28 is balanced within the transversely extending socket 25 by means of a spring 79 which fits under the slidable block 34 and urges the work piece gripping unit 28 upwardly as shown in Figure 3 with the result that the V-shaped gripping surfaces 52 and 53 are in their released position with respect to a work piece.

As illustrated in Figure 4, the slidable block 34 is provided on opposite sides thereof with lateral extending fulcrum portions 66 and 67 respectively, whereby the work piece gripping unit 28 may laterally rock about the fulcrum portions in the transversely extending socket 25 and thereby bodily shift the position of the jaws with respect to the axis of rotation of the chuck body. Thus, it is to be noted that the body position of the jaws may be universally shifted in a plane relative to the chuck body, whereby the jaws will automatically adjust themselves to off-center relative to a work piece when the latter is held in a lathe between centers.

In operation, the work piece may be held on the work center 19 of the rotary spindle and the corresponding work spindle upon the tail stock. Upon rotation of the chuck, the mass member 58 under the action of centrifugal force rotates the pivot pin 57 and thereby swings the gripping teeth 54 of the hinged jaw 37 towards the V-shaped gripping surfaces 52 and 53. The gripping surface 54 of the hinged jaw 37 is laterally disposed of the pivot pin 57 and thus the action of the three jaws is such that they automatically grip the work piece and the more the resistance that the hinged jaw 37 meets in turning the work piece, the more the hinged jaw 37 tends to turn, thus providing a tighter grip for holding the work piece with increased load. In the event that the external surface of the work piece is off-center with respect to the work center 19, then the gripping unit 28 universally moves within the socket 25 to accommodate the off-center relationship of the work piece with reference to its axis of rotation. The work piece is automatically released from the gripping jaws when the rotation of the chuck is stopped, after which the operator may remove the work piece.

Figure 6:
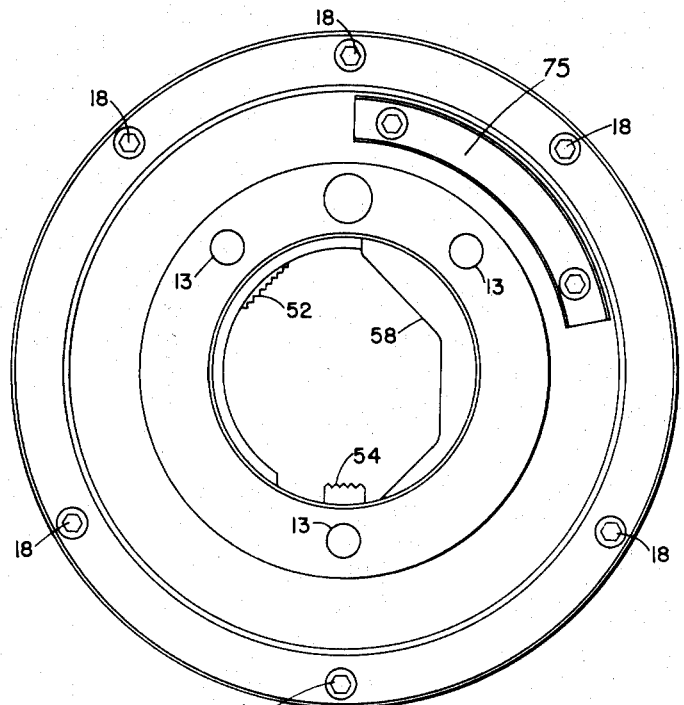
Figure 6 is a rear view of the chuck.
Figure 7:
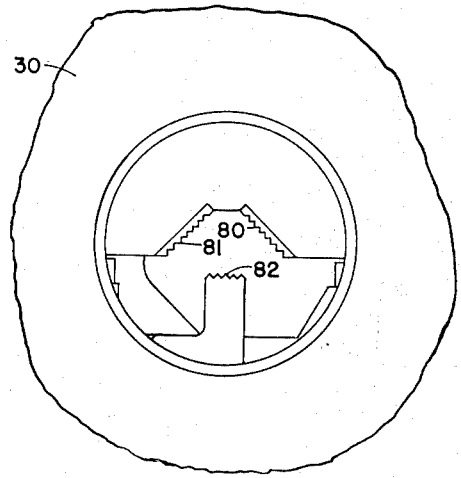
Figure 7 is a fragmentary view of the front of the chuck showing principally a new set of the jaws which are adapted to be interchangeably mounted therein instead of the set shown in the previous views.
Figure 8:
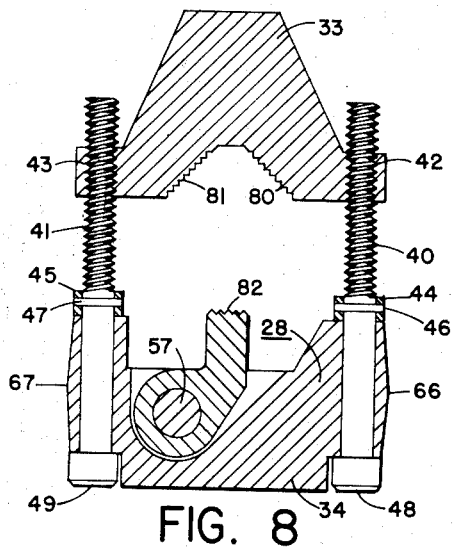
Figure 8 is a cross-sectional view of the new set of jaws illustrated in Figure 7.

The figures are drawn substantially to one-half scale and the jaws shown in Figures 1 to 6 are adapted to accommodate work pieces ranging in diameter from approximately 2¼ inches to 3½ inches, the setting of the jaws in Figure 1 being for approximately 2¼ inches and the setting of the jaws in Figures 3 and 4 being for approximately 3½ inches. The Figures 7 and 8 illustrate a new set of jaws 80, 81 and 82 which are interchangeable with the set shown in the previous views and which will accommodate diameters of work pieces ranging from 1 inch to 2¼ inches, the setting of the jaws in Figure 7 being for approximately one inch and the setting of the jaws in Figure 8 being for approximately 2¼ inches. With two sets of jaws, the diameter of the work pieces may range from approximately one inch to 3½ inches. The back of the chuck, as illustrated in Figure 6, may be provided with a weight member 75 which balances the chuck with respect to the mass member 58, whereby the chuck may rotate under a balanced condition for high speed.

It is to be observed that the stop pin 59 in Figure 4 does not occupy the same angular position as it does in Figure 5. The angular shifting of the position of the stop pin 59 results from the fact that the rotary chuck assembly 14 is allowed to turn relative to the positively driven circular chuck body 10. Upon rotation of the rotary spindle 11 when a work piece is being turned, the rotary chuck assembly 14 will tend to lag behind the rotation of the circular body 10 with the result that the gripping jaws grip the work piece harder, the more that the work piece encounters resistance to rotation, thereby providing a good strong grip on the work piece. In other words, the greater resistance to rotation of the work piece, the greater the gripping of the work piece by the jaws. Upon stopping the rotation of the lathe, the rotary chuck assembly 14 will tend to lead the rotation of the circular body 10 and thereby return the parts to the position shown in full lines in Figure 5. The position shown in Figure 4 represents the position of the parts when gripping the work piece by the rotation of the circular body 10. The drive is through the stop pin 59 and the mass member 58.

Thus, the mechanical drive connection between the positively driven circular chuck body 10 and the rotary chuck assembly 14 is through the mass member 58 which is connected at one end to the swinging or hinged jaw 37 and which presses at its other end against the stop pin 59. Relative movement between the chuck body 10 and the rotary chuck assembly 14, occurs between the outer periphery of the circular chuck body 10 and the inner surface of the circular flange 16.

In practice, to accommodate work pieces of a large range of diameters, the operator uses the set of jaws which most suitably fits the size of the work piece, making whatever adjustments that are necessary by turning the adjustment screws 40 and 41. After the adjustment screws 40 and 41 are turned to give the proper spacing for the block 33 and 34, the operator may then adjust the adjustment stop elements 69 and 70 which, when adjusted, are held in place by spring biased balls 77 and 76, respectively. The weight of the gripping unit 28 is balanced between the opposing adjustment stop elements 69 and 70 by the spring 79 which fits into a recess socket in the adjustment stop element 69.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A chuck comprising a chuck body having a work piece gripping unit mounted thereon, said gripping unit having block means provided with at least first, second and third jaws, said third jaw being movable relative to said first and second jaws and all of said jaws being bodily connected together on said block means and being universally mounted so as to be movable in a plane as a unit relative to said chuck body, and lever means urging said jaws together by torque applied to said chuck body.

2. A chuck comprising a chuck body, having a work piece gripping unit mounted thereon, said gripping unit having block means provided with at least first, second and third jaws, said third jaw being movable relative to said first and second jaws and all of said jaws being bodily connected together on said block means and being universally movable in a plane as a unit relative to said chuck body, said first and second jaws defining substantially a V-shaped gripping surface, said third jaw having a gripping surface facing said V-shaped gripping surface, means for pivotally mounting said third jaw on said block means, whereby engagement of the gripping surface on said third jaw with a work piece produces increased gripping action, and mass means connected to said third jaw and responsive to the rotation of said chuck body to swingably move the gripping surface on said third jaw relatively toward said V-shaped gripping surface.

3. A chuck comprising a chuck body having a work piece gripping unit mounted thereon, said gripping unit having block means provided with at least first, second and third jaws, said third jaw being movable relative to said first and second jaws and all of said jaws being bodily connected together on said block means and being universally movable in a plane as a unit relative to said chuck body, said first and second jaws defining substantially a V-shaped gripping surface, said third jaw having a gripping surface facing said V-shaped gripping surface, means for pivotally mounting said third jaw on said block means, whereby engagement of the gripping surface on said third jaw with a work piece produces increased gripping action, mass means connected to said third jaw and responsive to the rotation of said chuck body to swingably move the gripping surface on said third jaw relative toward said V-shaped gripping surface, spring means to oppose the movement of said mass means for urging the gripping surface and on the third jaw away from said V-shaped gripping surface, adjustable means independent of said mass means for moving the V-shaped gripping surface and the gripping surface on the third jaw relative to each other to accommodate work pieces of variable diameters.

4. An automatic chuck comprising, a rotary chuck body having a socket, a gripping unit having jaws for gripping a work piece, said gripping unit being slidably mounted and confined in said socket and being rotated with said chuck body, said socket having opposing guide edge surfaces defining a path along which the said gripping unit may move in a first direction transversely of said rotary chuck body and thereby bodily change the position of the jaws in said first direction with respect to the axis of rotation of the chuck body, said gripping unit having on opposite edges thereof laterally extending fulcrum portions slidably engaging the guide edge surfaces of the socket to permit said gripping unit to laterally rock about said fulcrum portions in said socket and thereby bodily change the position of the jaws in a second direction lateral of said first direction.

5. An automatic chuck comprising, a rotary chuck body having a socket, a gripping unit having jaws for gripping a work piece, said gripping unit being slidably mounted and confined in said socket and being rotated with said chuck body, said socket having opposing guide edge surfaces defining a path along which the said gripping unit may move in a first direction transversely of said rotary chuck body and thereby bodily change the position of the jaws in said first direction with respect to the axis of rotation of the chuck body, said gripping unit having on opposite edges thereof laterally extending fulcrum portions slidably engaging the guide edge surfaces of the socket to permit said gripping unit to laterally rock about said fulcrum portions in said socket and thereby bodily change the position of jaws in a second direction lateral of said first direction, and mass means responsive to the rotation of the chuck body to move said jaws relative toward each other.

6. An automatic chuck comprising, a rotary chuck body having a socket, a gripping unit having jaws for gripping a work piece, said gripping unit being slidably mounted and confined in said socket and being rotated with said chuck body, said socket having opposing guide edge surfaces defining a path along which the said gripping unit may move in a first direction transversely of said rotary chuck body and thereby bodily change the position of the jaws in said first direction with respect to the axis of rotation of the chuck body, said gripping unit having on opposite edges thereof laterally extending fulcrum portions slidably engaging the guide edge surfaces of the socket to permit said gripping unit to laterally rock about said fulcrum portions in said socket and thereby bodily change the position of the jaws in a second direction lateral of said first direction, mass means responsive to the rotation of the chuck body to move said jaws relative toward each other, and adjustment means independent of said mass means to move said jaws relative to each other to accommodate work pieces of variable diameters.

7. An automatic chuck comprising, a rotary chuck body having a socket, a gripping unit having jaws for gripping a work piece, said gripping unit being slidably mounted and confined in said socket and being rotated with said chuck body, said socket having opposing guide edge surfaces defining a path along which the said gripping unit may move in a first direction transversely of said rotary chuck body and thereby bodily change the position of the jaws in said first direction with respect to the axis of rotation of the chuck body, said gripping unit having on opposite edges thereof laterally extending fulcrum portions slidably engaging the guide edge surfaces of the socket to permit said gripping unit to laterally rock about said fulcrum portions in said socket and thereby bodily change the position of the jaws in a second direction lateral of said first direction and lateral with respect to the axis of rotation of the chuck body, mass means responsive to the rotation of the chuck body to move said jaws relative toward each other, adjustment means independent of said mass means to move said jaws relative to each other to accommodate work pieces of variable diameters, and means to limit the movement of said gripping unit relative to said chuck body in said first and second directions.

8. An automatic chuck comprising, a rotary chuck body having a socket, a gripping unit having block means provided with jaws for gripping a work piece, said gripping unit being slidably mounted and confined in said socket and being rotated with said chuck body, said socket having opposing guide edge surfaces defining a path along which the said gripping unit may move in a first direction transversely of said rotary chuck body and thereby bodily change the position of the jaws in said first direction with respect to the axis of rotation of the chuck body, said block means having on opposite edges thereof laterally extending fulcrum portions slidably engaging the guide edge surfaces to permit said gripping unit to laterally rock about said fulcrum portions in said socket and thereby bodily change the position of the jaws in a direction lateral of said first direction and lateral with respect to the axis of rotation of the chuck body, said first and second jaws defining substantially a V-shaped gripping surface, said third jaw having a gripping surface facing said V-shaped gripping surface, means for pivotally mounting said third jaw on said block means, whereby engagement of the gripping surface on said third jaw with a work piece produces increased gripping action, and mass means connected to said third jaw and responsive to the rotation of said chuck body to swingably move the gripping surface on said third jaw relatively toward said V-shaped gripping surface.

9. An automatic chuck comprising, a rotary chuch body having a socket, a work piece gripping unit slidably mounted and confined in said socket and being rotated with said chuck body, said gripping unit comprising first and second block members slidably mounted in said socket, said first block member having first and second jaw defining a substantially V-shaped gripping surface, said second block having a pivotal opening therein, a pivot pin rotatably mounted in said pivotal opening, a third jaw-rotatably connected to said pivot pin and having a gripping surface disposed laterally of said pivot pin and swingably movable relative to said V-shaped gripping surface, whereby engagement of the gripping surface on the third jaw with a work piece produces increased gripping action, a mass member non-rotatably connected to said pivot pin and respective to the rotation of the chuck body to swing said gripping surface of the third jaw toward said V-shaped gripping surface, spring means to oppose the movement of the mass member for urging the gripping surface of the third jaw away from said V-shaped gripping surface, a threadable element for adjustably interconnecting the first and second block members together as a unit with the block members being adjustably movable toward and away from each other to accommodate work pieces of variable diameters, said socket having opposing guide edge surfaces defining a path along which the said gripping unit may move in a first direction transversely of said rotary chuck body and thereby bodily change the position of the jaws in said first direction with respect to the axis of rotation of the chuck body, said gripping unit having on opposite edges thereof laterally extending fulcrum portions slidably engaging the guide edge surfaces of the socket to permit said gripping unit to laterally rock about said fulcrum portions in said socket and thereby bodily change the position of the jaws in a second direction lateral of said first direction and lateral with respect to the aixs of rotation of the chuck body.

10. An autmatic chuck comprising, a rotary chuck body having a socket, a work piece gripping unit slidably mounted and confined in said socket and being rotated with said chuck body, said gripping unit comprising first and second block members slidably mounted in said socket, said first block member having first and second jaws defining a substantially V-shaped gripping surface, said second block having a pivotal opening therein, a pivot pin rotatably mounted in said pivotal opening, a third jaw non-rotatably connected to said pivot pin and having a gripping surface disposed laterally of said pivot pin and swingably movable relative to said V-shaped gripping surface, whereby engagement of the gripping surface on the third jaw with a work piece produces increased gripping action, a mass member non-rotatably connected to said pivot pin and responsive to the rotation of the chuck body to swing said gripping surface of the third jaw toward said V-shaped gripping surface, spring means to oppose the movement of the mass member for urging the gripping surface of the third jaw away from said V-shaped gripping surface, a threadable element for adjustably interconnecting the first and second block members together as a unit with the block members being adjustably movable toward and away from each other to accommodate work pieces of variable diameters, said socket having opposing guide edge surfaces defining a path along which the said block members may move in a first direction transversely of said rotary chuck body and thereby bodily change the position of the jaws in said first direction with respect to the axis of rotation of the chuck body, said second block member having on opposite edges thereof laterally extending fulcrum portions in said socket and thereby bodily change the position of the jaws in a second direction lateral of said first direction and lateral with respect to the axis of rotation of the chuck body.

11. An automatic chuck comprising, a rotary chuck body having a socket, a work piece gripping unit slidably mounted and confined in said socket and being rotated with said chuck body, said gripping unit comprising first and second block members slidably mounted in said socket, said first block member having first and second jaws defining a substantially V-shaped gripping surface, said second block having a pivotal opening therein, a pivot pin rotatably mounted in said pivotal opening, a third jaw non-rotatably connected to said pivot and having a gripping surface disposed laterally of said pivot pin and swingably movable relative to said V-shaped gripping surface, wherby engagement of the gripping surface on the third jaw with a work piece produces increased gripping action, a mass member non-rotatably connected to said pivot pin and responsive to the rotation of the chuck body to swing said gripping surface of the third jaw toward said V-shaped gripping surface, spring means to oppose the movement of the mass member for urgin the gripping surface of the third jaw away from said V-shaped gripping surface, a threadable element for adjustably interconnecting the first and second block members together as a unit with the block members being adjustably movable toward and away from each other to accommodate work pieces of variable diametesr, said socket having opposing guide edge surfaces defining a path along which the said block members may move in a first direction transversely of said rotary chuck body and thereby bodily change the position of the jaws in said first direction with respect to the axis of rotation of the chuck body, threadable means to adjustably limit the movement of the block members relative to said chuck body in said first direction, said second block member having an opposite edges thereof laterally extending fulcrum portions slidably engaging the guide edge surfaces of the socket to permit said block members to laterally rock about said fulcrum portions in said socket and thereby bodily change the position of the jaws in a second direction lateral of said first direction and lateral with respect to the axis of rotation of the chuck body.

12. A chuck comprising a positively driven body, a chuck assembly having a swinging jaw to engage a work piece, said chuck assembly being rotative relative to said driven body and mounted on the same axis as said driven body, and driving means interconnecting said driven body and said swinging jaw to rotate same about said axis.

13. A chuck comprising a positive driven chuck body, a chuck assembly having a work piece gripping unit mounted thereon, said chuck assembly being rotatively mounted on said driven chuck body, said gripping unit having block means provided with at least first, second and third third jaws, said third jaw being movable relative to said first and second jaws and all of said jaws being bodily connected together on said block means and being universally movable in a plane as a unit relative to said chuck body, said first and second jaws defining substantially a V-shaped gripping surface, said third jaw having a gripping surface facing said V-shaped gripping surface, means for pivotally mounting said third jaw on said block means, and driving means interconnecting said driven body and said third jaw to swingable move the gripping surface on said third jaw relatively toward said V-shaped gripping surface.

14. A work driver including a driver body and a driven body having a common axis of rotation, a jaw pivotally carried by said driven body, lever means fixedly connected to said jaw and hence pivotable about said pivot, said lever means actuable by centrifugal force to urge said jaw toward said axis, and abutment means acting between said driver body and said lever to urge said jaw toward said axis by torque applied from said driver body, said jaw adapted to contact a work piece rotatable about said common axis, said pivot axis so disposed relative to said common axis that resistance to turning of a work piece engaged by said jaw urges said jaw toward said common axis.

15. A work driver including a driver body and a driven body having a common axis of rotation, a first jaw carried by said driven body on one side of said axis, a second jaw pivotally carried by said driven body and disposed on the other side of said axis from said first jaw, lever means fixedly connected to said second jaw and hence pivotable about said pivot, said lever means actuable by centrifugal force to urge said second jaw toward said first jaw, and abutment means acting between said driver body and said lever to urge said second jaw toward said first jaw by torque transmitted from said driver body, said pivot axis so disposed relative to said common axis that resistance to turning of a work piece engaged by said jaws urges said second jaw toward said first jaw.

16. A work driver including a driver body and a driven body having a common axis of rotation, block means carried by said driven body and transversely slidable therein, a first jaw carried by said block means on one side of said axis, a second jaw pivotally carried by said block means and disposed on the other side of said axis from said first jaw, lever means fixedly connected to said second jaw and hence pivotable about said pivot, said lever means actuable by centrifugal force to urge said second jaw toward said first jaw, abutment means acting between said driver body and said lever to urge said second jaw toward said first jaw by torque transmitted from said driver body, and a gripping surface on said second jaw, said pivot axis being disposed further from said common axis than said gripping surface so that torque transmitted to a work piece engaged by said jaws urges said second jaw toward said first jaw.

17. A work driver including a driver body and a driven body having a common axis of rotation, block means carried by said driven body and transversely slidable therein, fulcrum means between said block means and said driven body establishing a small adjustment lateral to both said transverse movement and to said axis, a first jaw carried by said block means on one side of said axis, a second jaw pivotally carried by said block means and disposed on the other side of said axis from said first jaw, a gripping surface on said second jaw, said pivot axis being disposed further from said common axis than said gripping surface, a line joining said common axis and said pivot axis and lying forward of said gripping surface relative to the direction of torque applied to said driven body, lever means fixedly connected to said second jaw and hence pivotable about said pivot, the mass of said lever means causing said lever means to be actuable by centrifugal force to urge said second jaw toward said first jaw, abutment means acting between said driver body and said lever to urge said second jaw toward said first jaw by torque transmitted from said driver body to said driven body through said lever, and a spring urging said jaws apart.

WALTER F. WILHELM.
MAX DE HAAS.

References Cited in the file of this patent

UNITED STATES PATENTS

| Number | Name | Date |
|---|---|---|
| 361,668 | Beers | Apr. 26, 1887 |
| 997,167 | Werth | July 4, 1911 |
| 1,867,712 | Reitzig | July 19, 1932 |
| 2,443,526 | Williamson | June 15, 1948 |
| 2,460,890 | Lassy | Feb. 8, 1949 |

FOREIGN PATENTS

| Number | Country | Date |
|---|---|---|
| 481,505 | France | Sept. 19, 1916 |